United States Patent [19]

Yokogawa et al.

[11] Patent Number: 4,908,811

[45] Date of Patent: Mar. 13, 1990

[54] METHOD AND APPARATUS FOR DATA RECORDING AND REPRODUCING WITH ERROR REDUCTION

[75] Inventors: Fumihiko Yokogawa; Hiroyuki Hirano, both of Saitama, Japan

[73] Assignee: Pioneer Electronic Corporation, Tokyo, Japan

[21] Appl. No.: 248,063

[22] Filed: Sep. 23, 1988

[30] Foreign Application Priority Data

Dec. 17, 1987 [JP] Japan .................................. 62-319564

[51] Int. Cl.[4] .............................................. G11B 7/00
[52] U.S. Cl. ........................................ 369/54; 369/60;
360/53; 371/5.1; 371/30
[58] Field of Search ........................ 369/54, 53, 59, 60;
360/7, 33.1, 39; 371/30, 5.1

[56] References Cited

U.S. PATENT DOCUMENTS 4,367,495 1/1983 Mita et al. ............................. 360/39
4,768,108 8/1988 Higurashi .......................... 360/19.1

Primary Examiner—Robert L. Richardson
Attorney, Agent, or Firm—Sughrue, Mion, Zinn, Macpeak & Seas

[57] ABSTRACT

An optical disk data recording and reproducing apparatus includes variable delay circuits in the recording and reproducing sections of the apparatus. The delay of the reproducing section delay circuit is adjusted when the error ratio determined for a reproduced data signal corresponding to a recorded data signal is greater than a predetermined value. When the error ratio is less than the predetermined value after adjustment of the delay circuit, the delay of the delay circuit in the recording section is adjusted to match the adjusted delay of the reproducing section delay circuit and the delay of the latter circuit is retured to its original value.

5 Claims, 4 Drawing Sheets

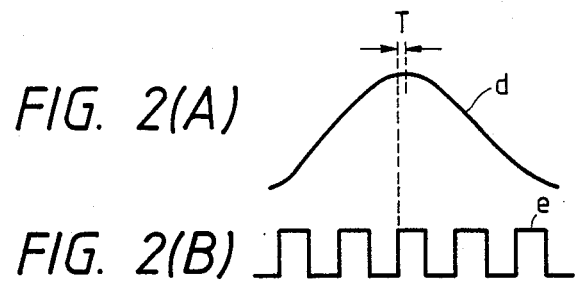
FIG. 2(A)
FIG. 2(B)
FIG. 5
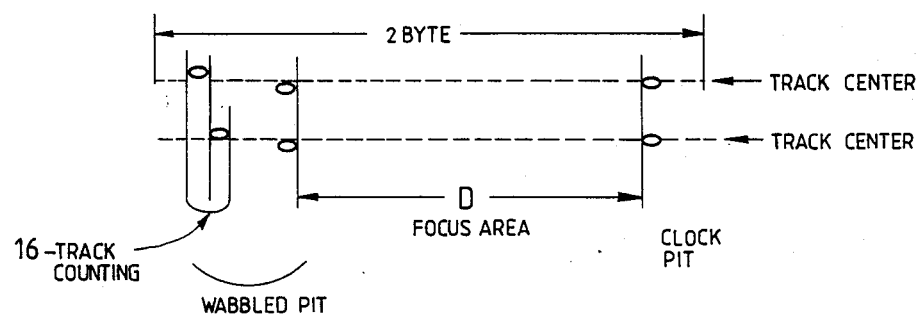
FIG. 6
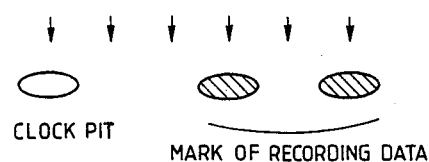

METHOD AND APPARATUS FOR DATA RECORDING AND REPRODUCING WITH ERROR REDUCTION

BACKGROUND OF THE INVENTION

The present invention relates to a method and implementing apparatus for data recording and reproducing, and more particularly it relates to a method and apparatus for optical recording/reproducing using an optical disk.

In optical recording/reproducing systems using DRAW (Direct Read After Write) disks, two different tracking control techniques are employed in formatting for optical recording and reproducing.

One is called the Continuous Servo Format. In this system signals are optically recorded in a continuous groove or on a continuous land on a disk surface.

The other is called the Sampled Servo Format. The present invention to be described in detail hereinafter is related to this format. With the Sampled Servo Format each sector is divided into 43 segments, each a servo block, and each servo block consists of a series of 2 preliminary bytes carrying servo information (servo bytes) and a balance of 16 bytes carrying data information (data bytes). As shown in FIG. 5. the servo area in which the servo bytes are recorded is composed of two wobble marks (pits) for tracking control and one clock mark- (pit) for synchronization. The wobble marks (pits) are located at positions one of which is offset towards the center of the disk and the other towards the outer radius relative to the center of an imaginary track on a disk surface.

When an optical pick-up head (a photosensing spot to detect information) correctly passes in the center of the imaginary track, the amplitude of reflected signals received by the head at the position of each offset wobble mark are identical because the magnitude of the divergence of the inner and outer marks relative to the center is the same. In such case, the amplitude of the reflected signal is the same for each wobble mark. When the optical pick-up head does not correctly pass in the center of the imaginary track, the amplitude of reflected signal received by the head varies depending on the direction and magnitude of divergence of the pick-up head from the center of the imaginary track. Such divergence of the head from the imaginary track causes the amplitude of the reflected light from each wobble mark to be different. The tracking error signal is derived from this amplitude difference, and held until the next servo area is sensed.

The distance between the two wobble marks changes every 16 tracks. Track position information in the fast-seek mode is derived by detecting this distance.

Referring again to FIG. 5. the distance (D) between the second wobble mark and the clock mark is a predetermined length which does not appear in the other data bytes, and is called the "unique distance". Therefore, this distance can also be used to produce a synchronization signal. The various timing signals are then derived from this synchronization signal. The clock signal is derived from the repetition of the clock mark. The surface in the "unique distance" (D) between the second wobble mark and clock mark, is assigned as a focusing area from which a focus error signal is obtained. The focus error signal is held while the data areas are scanned by the pick-up head and remains held until the next servo area is scanned.

On rotating a Sampled Servo Format, DRAW disk at 1800 rpm. an edge of a clock signal pulse included in the RF signal appears with a frequency of 41.28 kHz.

The recording/reproducing apparatus reads address information recorded at positions following the aforesaid servo bytes as shown in FIG. 6 to record and reproduce the information signals in the data area of the Sampled Servo Format. DRAW disk. in the manner well known in the prior art. A block diagram of such a conventional recording/reproducing apparatus is illustrated in FIG. 1.

The conventional technique for recording/reproducing a DRAW disk will now be explained with reference to FIG. 1. To accomplish reproduction, the RF signal reproduced by a pick-up head (1) from a disk (not shown) is boosted in a head amplifier (2) and inputted to a derivative-edge-detection circuit (3). The derivative-edge-detection circuit (3) is designed to detect the edge of the signal generated by differentiating of the RF signal, and to supply a series of edge pulses each corresponding to an edge of the differentiated RF signal. The edge pulse (a) which is outputted form the derivative pulse-edge detection circuit (3) is delayed by a delay circuit (4) and supplied to a PLL (Phase Locked Loop) circuit (5) and a synchro-detection-protection circuit (6).

The PLL circuit (5) comprises an AND gate to which is supplied the edge pulse (a) as one of the input signals. It is designed to generate a reproduced clock signal (e) which is synchronized with the output signal from the AND gate. The reproduced clock signal (e) is introduced to the synchro-detection-protection circuit (6) from the PLL circuit (5). The synchro-detection-protection circuit (6) measures the pulse spacing between any two series of edge pulses (a) by counting the reproduced clock signals (e) and deriving a synchro-detection signal (b) only when the measured pulse spacing is identical to a specified predetermined value. This synchro-detection signal (b) is introduced, to a gate pulse generating circuit (7). The gate pulse generating circuit (7) is designed to generate a clock gate pulse (c) with a predetermined pulse interval when a predetermined delay time has passed since said synchro-detection signal is inputted, which time is based on the reproduced clock signal (e) from the PLL circuit (5). The clock gate pulse (c) supplied from the gate pulse generating circuit (7) is another input signal to the AND gate of the PLL circuit (5). As a result, a clock edge pulse which corresponds to the clock mark is derived and outputted from the AND gate of the PLL circuit (5) to generate the reproduced clock signal (e). The reproduced clock signal (e) in synchronism with the aforesaid clock edge pulse may for example, be of a frequency of 11.1456 MHz.

The RF signal (d) which is outputted from the head amplifier (2) is supplied to an A/D converter (9). The RF signal is sampled by the reproduced clock signal (e) in the A/D converter (9) and the sampled data converted into digital data. The digital data outputted from the A/D converter (9) are supplied to a demodulating circuit (10) where the data, modulated during the recording process, are demodulated into the original form. The demodulated data are processed by an error correction circuit (11) and outputted as the reproduced data signal.

In the recording process, the data to be recorded are supplied to a modulation circuit (12) for processing. The modulated data is delayed in a delay circuit (13) and then input to recording circuit (14) for application to the recording head (1). The amplitude of the output signal from the pick-up head (1) is controlled according to the modulated signal. In this way the data processed as described above are recorded on an optical disk.

In the aforesaid prior art technique, the time lag provided by the delay circuit (4) is set so that the leading edge of the reproduced clock signal (e) will correspond to the peak of the RF signal (d) (FIG. 2A) in the ND converter in order to realize accurate data reproduction.

Meanwhile, the data to be stored on a DRAW disk are recorded in synchronism with the reproduced clock signal (e) derived from the preformatted data. As the reproduced clock signal (e) correctly follows the variation of the disk like velocity caused by disk deflection, there is no need for a gap area to absorb an error due to variation of the line velocity. However, for reproducing a recorded signal, since it is based upon the reproduced clock signals (e) which are in synchronism with preformatted clock marks, the location of each recorded datum mark should be positioned where the distance between the center of the preformatted clock mark and that of each recorded datum mark are exactly an integer multiple of the clock distance. This positioning is obtained by the delay circuit (13) which absorbs various factors which cause the signal to be delayed such as: the head amplifier, the derivative circuit, the PLL circuit, the recording circuit, an optical retardation component from the disk surface to the photodetector, and a time lag required to complete making a datum mark on a recording layer when a photo-signal to be recorded is projected to the disk surface.

However, heretofore, because the delay time provided by this delay circuit (13) is fixed and therefore there are no means to adjust the time lag, the correct relationship between the reproduced clocks signals (e) and the peak of the RF signal has not been maintained (as illustrated in FIG. 2A and 2B) between the peak of the RF signal and the leading edge of the reproduced clock signal (e). The relationship between these signals will change due to aging or variations in the optical retardation of a recording layer on exchanging a DRAW disk. This causes a poor error ratio in the reproduced data.

PURPOSE OF THE INVENTION

The present invention is intended to overcome the previously stated difficulty. An object of the present invention is to provide a method for data recording and reproducing which can be successfully applied to improve the error ratio and prevent the occurrence of a poor error ratio caused by aging or exchange of the DRAW disk.

SUMMARY OF THE INVENTION

The foregoing object is accomplished in accordance with the teachings of the present invention by a method for data recording and reproducing which method includes the ordered steps of: (a) in response to a command, modulating a data signal to be recorded by the recording/reproducing clock signal which has been delayed by a first delay mean, (b) recording the aforesaid modulated signal with a time delay which is produced by a second delay mean, (c) reproducing the recorded signal, (d) calculating the error ratio of the data reproduced and demodulated by the recording/reproducing clock signal delayed by the first delay means, (e) and when the error ratio is greater than a specified predetermined value, adjusting the time lag of the first delay means and (f) repeating the above process from the step of reproducing the recorded signal. Apparatus for implementing this method is also provided.

BRIEF DESCRIPTION OF THE FIGURES

The invention will now be described with reference to the accompanying drawings. However, the following examples and figures are given merely to aid in the understanding of the present invention, and variations may be made by one skilled in the art without departing from the spirit and scope of the present invention.

FIGS. 2A and 2B demonstrate samples of the wave form which is outputted from the recording/reproducing circuit illustrated in FIG. 1.

FIG. 5 illustrates the pattern of the servo bytes applicable to the present invention.

FIG. 6 demonstrates positional relationship between a preformatted clock mark and data marks to be recorded.

DESCRIPTION OF THE PREFERRED EMBODIMENT

Figure 1:
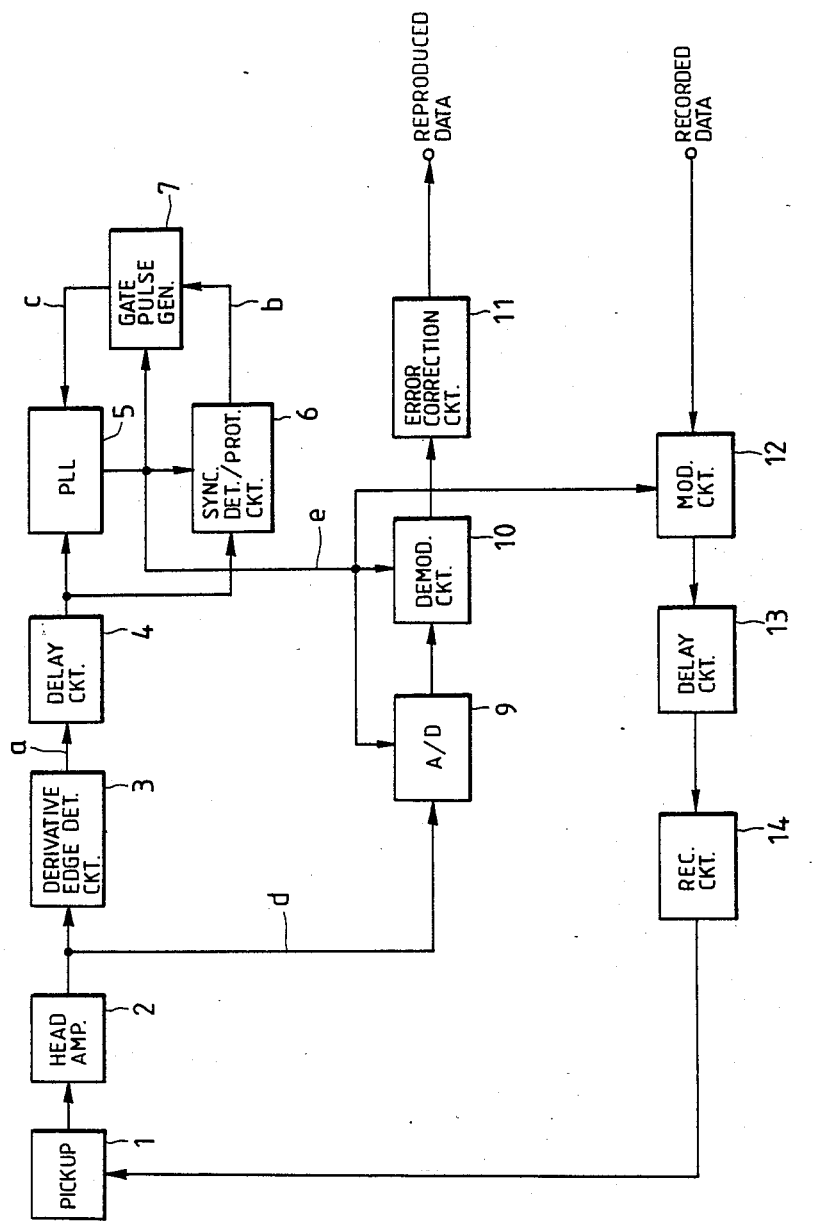
FIG. 1 is a block diagram of a prior art recording/reproducing circuit.
Figure 3:
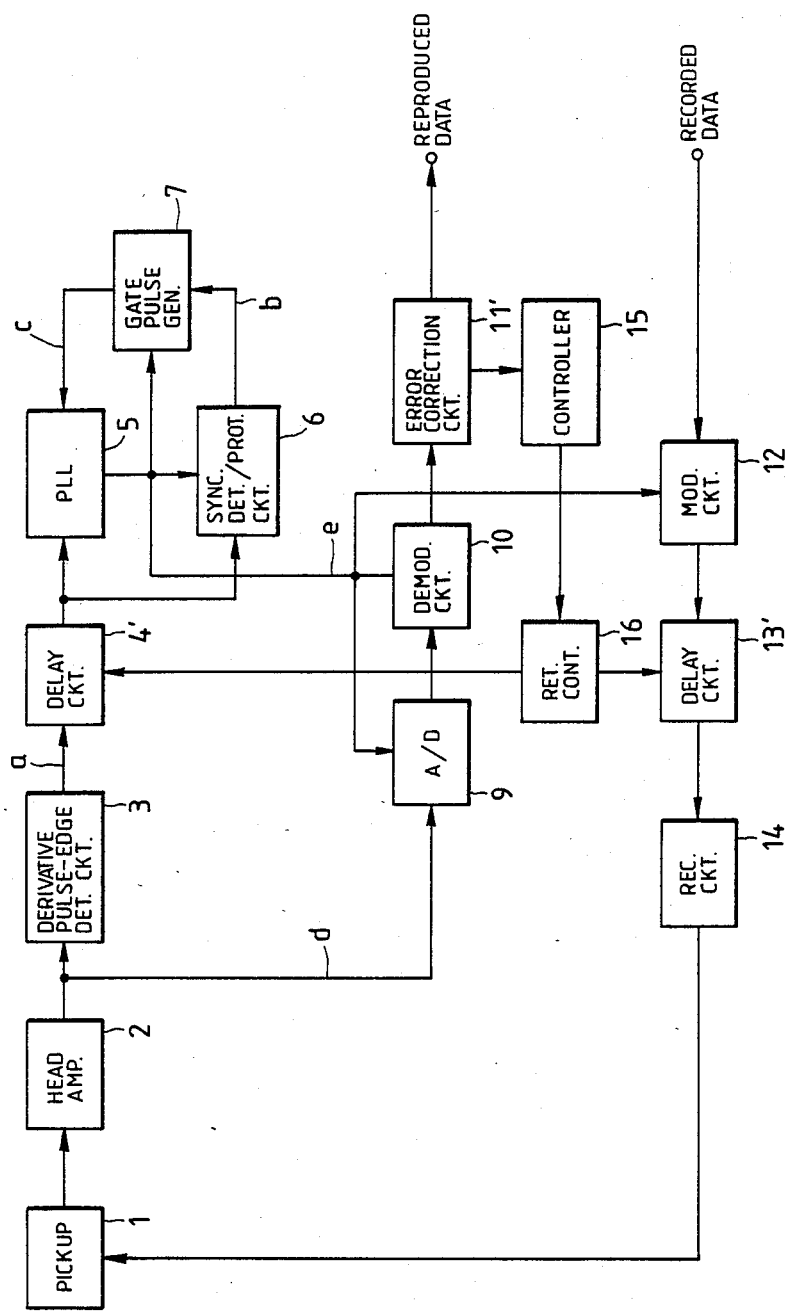
FIG. 3 is a block diagram of recording/reproducing circuitry for implementing the method of the present invention.

Referring to FIG. 3, an optical recording/reproducing circuit of the invention includes: an optical pick-up head (1), head amplifier (2), derivative pulse-edge detecting circuit (3), delay circuits (4'), (13'), PLL circuit (5), synchronization detection/protection circuit (6), gate pulse generator (7), A/D converter (9), demodulation circuit (10), error correction circuit (11'), modulation circuit (12) recording circuit (14). Like elements in FIGS. 1 and 3 are identified with common reference numerals. In accordance with the present invention an improved recording/reproducing circuit is realized with the error correction circuit (11') to output an error signal and delay circuits (4'), (13') for providing an adjustable time delay. The error signal output from the error correction circuit (11') is supplied to a controller (15). The controller is composed, for example, of a microcomputer consisting of micro-processors, ROMs (Read Only Memory) and RAMs (Random Access Memory). The microcomputer supplies various commands, which are derived from the error signal, to a delay controller circuit (16). The delay controller circuit (16). The delay controller circuit causes variable operation of the delay circuits (4') and (13') based on the command from the controller (15).

Figure 4:
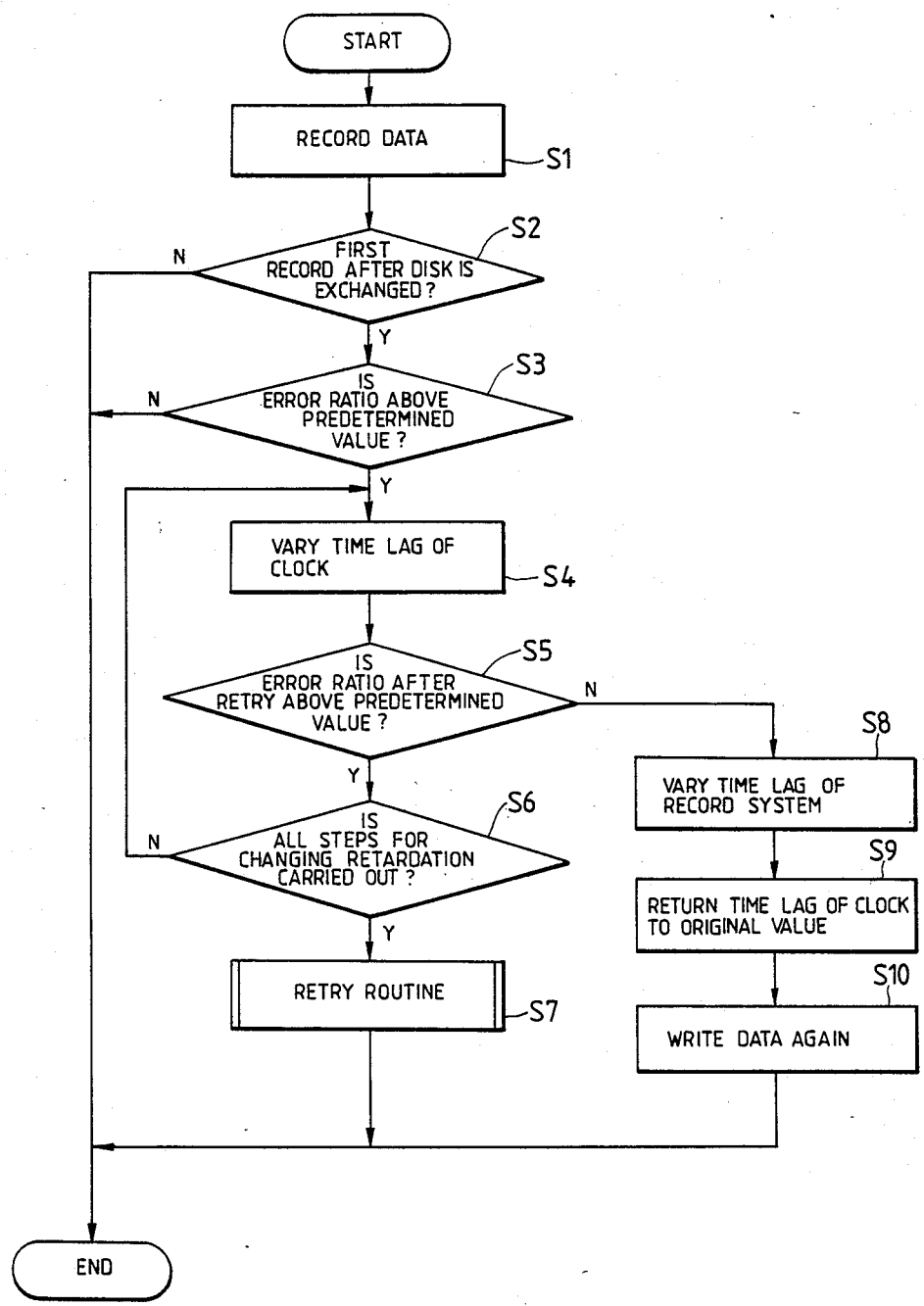
FIG. 4, is a flow chart representing the operation of the controller of the circuit of the present invention illustrated in FIG. 3.

Operation of the microprocessor of the controller (15) will now be explained in detail with reference to the flow chart of FIG. 4.

In response to a start command for recording, the processor of controller 15 brings the system into the first step, S1, which causes recording of the data signal in an assigned area. In the following step, S2, the processor judges if the recording is the first recording after the disk has been loaded into the apparatus. When it is determined that it is the first recording on a disk just loaded into the apparatus the processor causes read out of the data signals which were recorded in response to step S1. Then, in step S3 the processor calculates an error ratio of this first recording using information from the error correction circuit (11'), and judges if the error ratio is above a specified predetermined value. When the error ratio is so calculated and the result is that it is not above the specified predetermined value, the processor ends the routine and repeats the routine beginning with step S1 without changing the delay period of the delay circuits.

When the error ratio is calculated and the result is that it is above the predetermined maximum allowable value, the processor varies the time delay by a predetermined interval in step S4. Then, in step S5 it again reads out the recorded data signal and recalculates the error ratio, and then judges if it is above the predetermined maximum allowable value.

When the error ratio which is calculated in step S5 is above the predetermined allowable value, then in step 6, the processor checks if a margin of the adjustable delay still remains. When the margin remains, the operation process returns to step S4 again. However, if the entire adjustable range has been exhausted, the processor, in step 7, moves to a retry routine which causes a repeat recording in a newly assigned area.

When the error ratio which was calculated in step S5 is better than the allowable predetermined value, the processor in step 8 adjusts the delay time of delay circuit (13') to a time delay which corresponds to that of the delay circuit (4'), and in step S9 brings the time delay of delay circuit (4') to the original value. After this process of adjusting the time delays of the delay circuits for the first recording after a disk medium has first been loaded, the processor again records the data signal to be recorded with the better error ratio in step S10, and again initiates the routine which has previously been done in step S1.

According to the process described above, for the first recording after an exchange of a disk medium, recorded data signals are immediately reproduced to calculate an error ratio. The adjustable delay time of the delay circuit (4') is selected in order to keep the error ratio within the predetermined allowable level. The range of the optimum delay time was estimated from 10 ns up to 20 ns for various DRAW disks with different recording layer materials. Heretofore, the delay times for delay circuits were fixed and the problem above discussed arose that the apparatus could not adapt for different recording layer materials without the error ratio deteriorating.

The method in accordance with the present invention solves that problem by limiting the error ratio to the predetermined value, by providing an adjustable delay time of ±20 ns in periods of 5 ns.

In the preferred embodiment described above, adjusting the delay in the recording system was accomplished in step S8. In another embodiment of the present invention, the recording system delay time is not adjustable. Rather, delay adjustment is accomplished by fixing the delay time for the reproducing circuit which has been adjusted in step S4, and employing it to reproduce data signals with this improved condition while the same disk medium is loaded. In this embodiment, a time delay between the reproducing clock signal and the address data signal which had been already recorded in the preformatted address area might occur. Even in such cases, because the margin for jitter of the reproduced signal from preformatted data is wide enough, there are no severe problems occurring in practical commercial use. Also in this embodiment, the area for the first recording used in step S1 is not abandoned in any case and the recording capacity of the disk medium can be fully utilized.

As was described above, the method and implementing apparatus for data recording and reproducing in accordance with the present invention can prevent the error ratio of the reproduced signal from exceeding a predetermined maximum allowable value. The tendency of the error ratio to vary is the result of the variation of the time delay characteristics at each part of the recording/reproducing apparatus due to aging or variation of the optical delay of recording layer material as disks are exchanged in the apparatus.

What is claimed is:

1. A method of data recording and reproducing for use with a recording and reproducing apparatus which includes a pickup for recording on or reading from a recorded medium, a reproducing section which includes a first delay circuit for delaying a signal representing the data signals read from the recording medium, and a recording section which includes a second delay circuit which delays a modulated signal whose modulation represents the data to be recorded comprising the steps of:
   (a) modulating a data signal which is to be recorded by a recording/reproducing clock signal which has been delayed by said first delay circuit,
   (b) recording said modulated data signal with a time delay provided by said second delay circuit,
   (c) reproducing the data signal recorded in step (b) using the recording/reproducing clock signal delayed by said first delay circuit,
   (d) calculating the error ratio from said reproduced data signal,
   (e) determining if the calculated error ratio is greater than a predetermined maximum allowable value,
   (f) adjusting the delay interval provided by said first delay means if the error ratio is greater than said allowable value,
   (g) repeating steps (b) through (e), and
   (h) again adjusting the delay interval provided by said first delay circuit if the error ratio is still greater than said allowable value.

2. The method of data recording and reproduction as claimed in claim 1 further comprising the steps of, setting the delay interval of said first delay circuit as a reference delay interval and maintaining that delay interval until the then loaded recording medium is unloaded, when the calculated error ratio is below the predetermined maximum allowable value.

3. The method of data recording and reproducing as claimed in claim 1 wherein when the adjusted delay interval of said first delay circuit causes said reproducing section to reproduce said recorded data signal such that the error ratio is below said predetermined maximum allowable value, adjusting the delay interval of said second delay circuit such that it has a time delay interval which corresponds to that of the first delay circuit and thereafter resetting the time delay interval of said first delay circuit to its original time delay interval.

4. An apparatus for recording and reproducing data signals stored on a recording medium, said apparatus including a pickup head, a reproducing section and a recording section, said reproducing section comprising;
amplifier means for amplifying an RF signal from said pickup head representing the data read from the recording medium, derivative pulse edge detecting means for detecting an edge of a signal which is the derivative of said RF signal, a first variable delay circuit responsive to the detected pulse edge, a phased locked loop receiving the delayed pulse edge for producing a reproduced clock signal, an analog to digital converter receiving the amplified RF signal and an output from said phase locked loop for providing a digital signal representing said RF signal, a demodulator means for demodulating the digital signal, and an error calculating circuit for calculating the error ratio of said demodulated signal;
said recording section comprising;
means for receiving data to be recorded, modulator means for modulating said received data with the clock signal reproduced by said phase locked loop, a second variable delay circuit receiving said modulated data signals, and recording means for controlling said pickup head to record data signals on said recording medium in accordance with the modulated data signal.

5. The apparatus for recording and reproducing data signals as claimed in claim 4 further comprising controller means responsive to said error calculating circuit for causing the delay interval of said first variable delay circuit to change when the error ratio determined for a reproduced signal corresponding to a recorded signal is greater than a predetermined maximum level, and for causing the delay interval of the second variable delay circuit to correspond to the changed delay interval of said first variable delay circuit when a data signal reproduced with said changed first delay interval causes an error ratio below said predetermined maximum value and thereafter returning the delay interval of said first variable delay circuit to its unchanged level.

* * * * *